United States Patent
Oyasato et al.

(10) Patent No.: US 7,175,701 B2
(45) Date of Patent: Feb. 13, 2007

(54) FOAM AND METHOD OF MANUFACTURING THE SAME

(75) Inventors: Yumiko Oyasato, Yokohama (JP); Kentaro Yoshida, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/235,062

(22) Filed: Sep. 27, 2005

(65) Prior Publication Data

US 2006/0065159 A1   Mar. 30, 2006

(30) Foreign Application Priority Data

Sep. 30, 2004   (JP)   ............... 2004-287156

(51) Int. Cl.
*C08L 5/04*   (2006.01)
(52) U.S. Cl. ................ 106/122; 106/144.1; 106/144.6
(58) Field of Classification Search ............... 106/122, 106/144.1, 144.6
See application file for complete search history.

(56) References Cited

U.S. PATENT DOCUMENTS 3,688,437 A * 9/1972 Hamrin ..................... 47/57.6
4,609,403 A * 9/1986 Wittwer et al. ............. 106/122
5,382,285 A * 1/1995 Morrison .................... 106/122

FOREIGN PATENT DOCUMENTS

EP   0274348   * 7/1988
JP   5-254029 A2   10/1993

* cited by examiner

*Primary Examiner*—David M. Brunsman
(74) *Attorney, Agent, or Firm*—Finnegan, Henderson, Farabow, Garrett & Dunner, L.L.P.

(57) ABSTRACT

Disclosed is a foam comprising a matrix and cells included in the matrix. The matrix comprises denatured protein and at least one compound selected from the group consisting of alginic acid, salts thereof, and derivatives of alginic acid.

19 Claims, No Drawings

FOAM AND METHOD OF MANUFACTURING THE SAME

CROSS-REFERENCE TO RELATED APPLICATIONS

This application is based upon and claims the benefit of priority from prior Japanese Patent Application No. 2004-287156, filed Sep. 30, 2004, the entire contents of which are incorporated herein by reference.

BACKGROUND OF THE INVENTION

1. Field of the Invention

This invention relates to a foam and a method of manufacturing the foam.

2. Description of the Related Art

In recent years, from the viewpoint of environmental protection, there is an increasing demand for biodegradable resins and molded products thereof which can be decomposed in the natural environment, so that studies on biodegradable resins such as aliphatic polyester, etc., are now actively performed. Although resins of this kind are incapable of being decomposed under ordinary environments of use, the resins can be decomposed by the action of microorganisms into water and carbon dioxide under composting conditions of high temperature and high humidity. Therefore, biodegradable resins are expected to be a promising material for solving the problem of pollution since they are low in environmental load in the disposal thereof.

Most of biodegradable resins are synthesized from petroleum. When the exhaustion of petroleum as well as the problem of global warming caused by an increase in quantity of carbon dioxide throughout the world due to the disposal of used resins are taken into account, the idea to biodegrade materials that have been synthesized from petroleum is undesirable in viewpoint of carbon neutrality.

Under the circumstances mentioned above, it is now desired to develop biodegradable resins and molded products thereof, which can be synthesized and produced by using materials of natural origin without necessitating employment of fossil resources such as petroleum resources.

On the other hand, foam which is molded by using a resinous material is generally employed as a packaging material or as a heat insulating material by taking advantage of its shock absorbing and heat insulating properties. Even in the case of foam, it is now considered desirable to employ materials of natural origin without necessitating the consumption of petroleum resources. Incidentally, even in the case of foam made of natural origin, since most of the foaming agents currently employed for foam are made of chemical foaming agents, they are undesirable because of the problem of global warming and pollution due to chemical materials constituting the foaming agents.

As for biodegradable resins which are recently employed, there is known a foamed body of starch. Since this foam is formed of an organic material or a plant as a raw material, this foam can be decomposed by burying it in soil after use. Further, this foam is soluble in water, it can be disposed by dissolving it in water after use. However, there are problems that the water-solubility rate of this foam made from starch is not so fast as expected and that this foam cannot be dissolved in water unless the water is hot.

Under the circumstances, there has been developed a technique for manufacturing a foam by using alginic acid which is a water-soluble polymer. The alginic acids to be employed in this technique are included, in large quantities, mainly in seaweeds. Since there is no means to effectively utilize the seaweeds containing the alginic acids, the seaweeds are discarded without being utilized. Since the seaweeds containing the alginic acids are available in large quantities, the seaweeds are deemed to be preferable for use as a raw material in the manufacture of foam even when environmental problems are taken into account.

Foam of alginic acid according to the prior art has been manufactured through gelation of a water-soluble polymer. Because of the large quantity of water included in this water-soluble polymer, this water-soluble polymer is dried at a temperature of about 20 to 60° C. instead of heating it at an elevated temperature which is higher than the solidification temperature of protein. As a result, it takes a long time for the volatilization of water, thus degraded the working efficiency in the manufacture of foam. Although it is possible to employ protein as a polymer for constituting a foam, the cells to be formed by protein are more likely to be defoamed. Moreover, the number of cells gradually decreases with time, thereby making it impossible to retain the configuration of foam for a long period.

BRIEF SUMMARY OF THE INVENTION

A foam according to one aspect of the present invention comprising a matrix comprising denatured protein and at least one compound selected from the group consisting of alginic acid, salts thereof, and derivatives of alginic acid; and cells included in the matrix.

A method according to one aspect of the present invention comprises preparing an aqueous solution of protein having foamability and foam-stability; foaming the aqueous solution of protein having foamability and foam-stability to obtain a foamed aqueous solution; adding an aqueous solution of at least one compound selected from the group consisting of alginic acid, salts thereof, and derivatives of alginic acid to the foamed aqueous solution, thereby obtaining a mixture; stirring the mixture to obtain a homogeneous solution;

adding, in a solid state, at least one compound selected from the group consisting of alginic acid, salts thereof, and derivatives of alginic acid to the mixed solution, thereby obtaining a foam precursor; and drying by heating the foam precursor to denature the protein having foamability and foam-stability, thereby obtaining a foam comprising a matrix and cells dispersed in the matrix, the matrix comprising the at least one compound and the denatured protein.

A method according to another aspect of the present invention comprises preparing an aqueous solution containing a foaming agent and protein having foam-stability; foaming the aqueous solution to obtain a foamed aqueous solution; adding an aqueous solution of at least one compound selected from the group consisting of alginic acid, salts thereof, and derivatives of alginic acid to the foamed aqueous solution, thereby obtaining a mixture; stirring the mixture to obtain a homogeneous solution; adding, in a solid state, at least one compound selected from the group consisting of alginic acid, salts thereof, and derivatives of alginic acid to the mixed solution, thereby obtaining a foam precursor; and drying by heating the foam precursor to denature the protein having foam-stability, thereby obtaining a foam comprising a matrix and cells dispersed in the matrix, the matrix comprising the at least one compound and denatured protein.

DETAILED DESCRIPTION OF THE INVENTION

Next, embodiments of the present invention will be explained.

As a result of studies made by the present inventors on the manufacture of foam of alginic acid, salts thereof or the derivatives of alginic acid (hereinafter referred to simply as alginic acids), the following facts have been found out. Namely, it has been found possible to form uniform and stable cells by providing an aqueous solution of alginic acids with foamability and foam-stability and to form a foam of excellent properties by solidifying the cells. The present invention has been accomplished based on the aforementioned findings.

As for specific examples of the alginic acid, salts thereof, and derivatives of alginic acid (alginic acids), it is possible to employ a single substance of alginic acid represented by the following formula; and alginic salts including alkali metal (sodium, potassium, etc.) salts of alginic acid, and alkaline earth metal (calcium, magnesium, etc.) salts of alginic acid. The sugar skeleton which corresponds to the monomer constituting alginic acid includes functional groups such as a couple of hydroxyl groups and one carboxylic group. It is also possible to employ alginic acid derivatives wherein these functional groups are replaced by other groups. For example, hydroxyl group can be replaced by acetyl group or other groups and the carboxylic group can be replaced by amide group or propyl group, etc. Further, it is possible to employ alginic propylene glycol esters.

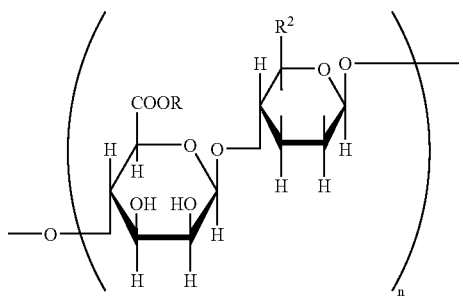

wherein R is Na, K or H; and $R^2$ is COOH or H.

In this embodiment, it is especially preferable to employ alkaline metal salts of alginic acid since these salts are easily soluble in water. These alginic acids are available on the market and sold as a thickener for example.

Alginic acids are water-soluble polymer and cannot be dissolved in a medium other than water. Even if alginic acids are dissolved in water and foamed by any suitable method such as stirring, it is impossible to obtain uniform cells since the alginic acids are liable to be thickened. For the same reason, even if alginic acids are foamed by using a foaming agent such as sodium hydrogen carbonate, it is impossible to obtain uniform cells. In order to create a foam mainly constituted by alginic acids, it is required to incorporate a material having foaming properties, i.e., a foamable material in the alginic acids to assist the foaming of alginic acids. This foaming-assisting action can be provided by using protein for example.

The denatured protein to be employed in the embodiments of the present invention can be obtained through the heating of protein. While protein before the denaturing thereof can be dissolved not only in water but also in alkali at normal temperatures, the denatured protein is insoluble in water and soluble only in alkali. Incidentally, alkali herein means an aqueous solution of sodium hydroxide for instance. As for specific examples of protein which are useful in the embodiment of the present invention, they include a simple substance of albumen, a simple substance of egg yolk, a simple substance of egg, gelatin, albumen, egg yolk, egg, saponin, an aqueous solution of albumin, etc. These proteins are provided with foamability and foam-stability. Therefore, protein such as albumen is capable of acting as a foaming agent as well as a foam-stabilizing agent. Alternatively, it is also possible to employ gluten, soybean protein, globulin, prolamine, glutelin, histone, protamine, etc. Since these proteins are provided only with foam-stability and not provided with foaming property, they can be employed in combination with a foaming agent. As for the foaming agent, it is possible to employ a surfactant.

In the embodiment of the present invention, it is possible to obtain a foam which is capable of retaining uniform and stable cells by using alginic acids, protein, and, if required, a surfactant as a foaming agent.

In the method of manufacturing a foam according to one embodiment of the present invention, alginic acids, and protein having foamability and foam-stability are employed as starting materials.

As already explained above, as for the protein having foamability and foam-stability, it is possible to employ, for example, a simple substance of albumen, a simple substance of egg yolk, a simple substance of egg, gelatin, albumen, egg yolk, egg, saponin, and albumin, etc. Since albumen is excellent in its ability to retain cells among these proteins, albumen is most preferable for use as a foaming agent. Since gelatin, saponin and albumin are respectively solid powder as they are employed as a simple substance, they are employed as an aqueous solution. The concentration of the aqueous solution can be determined in such a manner that the ratio between alginic acids and protein both ultimately constituting the foam can be optimized.

The mixing ratio between the alginic acids and the protein should preferably be such that the content of protein is confined to 5 to 300 parts by weight based on 100 parts by weight of alginic acids. More preferably, the content of protein should be confined to not more than 100 parts by weight based on 100 parts by weight of alginic acids. If the content of the protein is less than 5 parts by weight based on 100 parts by weight of alginic acids, it may become impossible to stabilize cells so that the cells are liable to be vanished prior to the formation of foam. On the other hand, if the content of the protein exceeds 300 parts by weight based on 100 parts by weight of alginic acids, the foam to be obtained would become insufficient in compression strength and fragile, thus possibly making it impossible to obtain a foam suited to practical use.

First of all, the protein is subjected to mixing by using a mixer to disperse air inside the protein, thus obtaining a foamed aqueous solution. If the protein is a liquid material such as a simple substance of albumen, a simple substance of egg yolk, a simple substance of egg, etc., the liquid protein can be employed as it is. If the protein is a solid material such as albumin, saponin and gelatin, the protein is formed into an aqueous solution for foaming it. When the protein is employed as an aqueous solution, if water content is too large, it may become difficult to form cells and to evaporate water in a subsequent step. On the other hand, if the water content is too small, it is also difficult to create excellent cells. Therefore, the quantity of water to be added should preferably be confined within the range of 2 to 5 parts by weight based on one part by weight of protein.

In order to improve the stability of cells, it is possible to incorporate sucrose. The content of sucrose should preferably be not more than 5% by weight based on the solution of protein. If the content of sucrose exceeds 5% by weight, the cells may collapse. If additives such as sucrose are to be employed, the additives can be added to an aqueous solution prior to the step of foaming protein. Even when alginic propyleneglycol ester is finally incorporated, it is possible to enhance the stability of the cells.

Then, to the foamed aqueous solution, an aqueous solution of alginic acids is added to obtain a mixture. The concentration of alginic acids in the aqueous solution should preferably be confined within the range of 3 to 10% by weight. If this concentration of alginic acids is less than 3% by weight, the strength of foam to be created would become weak, thereby making it difficult to secure a predetermined configuration of foam. On the other hand, if this concentration of alginic acids exceeds 10% by weight, the viscosity of the aqueous solution of alginic acids would become too high, thereby making it difficult to intermingle the aqueous solution of alginic acid with an aqueous solution of protein accompanied with cells. When the solubility of alginic salts to water is taken into account, the concentration of alginic acids in the aqueous solution should preferably be 5% by weight or so. After this step of adding alginic acids, the resultant mixture is again stirred by using a mixer for example. On this occasion, stirring of the mixture should preferably be performed gently so as not to collapse the cells.

To the mixed solution obtained in the preceding step, the solid powder of alginic acids is added and the resultant mixture is again stirred by using a mixer for example to obtain a foam precursor. On this occasion also, the stirring of the mixture should be performed gently so as not to collapse the cells. The quantity of the powder of alginic acids is adjusted in such a manner that a total of the quantity of alginic acids incorporated as an aqueous solution in the preceding step and the quantity of alginic acids to be added in this step would give a predetermined composition of foam. With respect to the ratio between the quantity of alginic acids to be added as an aqueous solution to the foamed aqueous solution and the quantity of alginic acids to be added in a solid state in this step, there is no specific limitation.

Polyhydric alcohol may be added to the mixture comprising alginic acids and protein, thereby enhancing the flexibility of foam. As for specific examples of polyhydric alcohol to be employed in this case, they include glycerin, polyvinyl alcohol, polyethylene glycol, etc. The polyhydric alcohol should preferably be incorporated in the foam at ratio of 1 to 10% by weight. If the mixing ratio of polyhydric alcohol is less than 1% by weight, it would be impossible to expect sufficiently the effects of adding polyhydric alcohol. On the other hand, if the mixing ratio of polyhydric alcohol exceeds 10% by weight, the mechanical strength of foam may be degraded.

In the embodiments of the present invention, the following components can be incorporated into the foam. These components (additives) are publicly known in the field of plastic materials, in particular, in the field of plastic foam.

Specific examples of these additives useful in the embodiment of the present invention are, for example, a foam stabilizer, a reinforcing filler, a fire retardant, a stabilizing agent, an ultraviolet absorber, an antioxidant, an antistatic agent, an anti-fogging agent, a colorant, a nucleating agent, a compatibilizing agent, an antiblocking agent, an inorganic electrolyte, a filler, a plasticizing agent, a lubricant, a kicker, pigment, dye, perfume, etc. The content of these additives should preferably be confined to not more than 5 parts by weight based on 100 parts by weight of foam. If the mixing ratio of these additives exceeds 5 parts by weight, the mechanical strength of foam may be deteriorated.

After the preparation of the foam precursor through homogeneous mixing of alginic acids with protein, the foam precursor is placed in a mold made of aluminum for example and heated at a temperature ranging from 100° C. to 180° C. to evaporate water included in the foam precursor and, at the same time, the protein is allowed to cure, thereby setting the cells. If the temperature of heat-drying in this case is lower than 100° C., water included in a large quantity in the foam precursor may remain therein without being sufficiently volatilized. On the other hand, if the temperature of heat-drying exceeds 180° C., the ether bond contained in alginic acid may be cut off due to the heat.

Although there is no particular limitation with regard to the heating time in this occasion, a period of 10 minutes to 24 hours would be sufficient. If the heating time is less than 10 minutes, the water included in the foam precursor may not be sufficiently volatilized and, at the same time, the protein may not be sufficiently cured, so that the cells in the foam may be vanished after the cooling of the foam. On the other hand, if the heating time exceeds 24 hours, the ether bond contained in alginic acid may be cut off due to the heat.

By the process of aforementioned steps, it is possible to manufacture a foam which is mainly comprising alginic acids and having uniform cells.

In the foam according to one embodiment of the present invention, the alginic acids are mainly constituted by carbon atoms, hydrogen atoms and oxygen atoms, and the protein includes in its molecule nitrogen atom. Accordingly, the control of the content of nitrogen atoms in the foam can be effected by controlling the quantity of protein in the foam.

Incidentally, there is not any particular limitation with regard to the configuration of porous body of foam according to the embodiment of the present invention. With respect to the compression strength of foam, it may generally range from 10 to 35 MPa at 10% strain, from 20 to 50 MPa at 20% strain, and from 25 to 70 MPa at 30% strain.

The protein having foamability and foam-stability to be employed in the aforementioned method can be replaced by a combination of protein having foam-stability and a surfactant. In the manufacturing method of a foam according to another embodiment of the present invention, the raw materials to be employed therein are constituted by alginic acids, protein having foam-stability and a surfactant.

The protein having foam-stability may be expressed as a solidifying component. This solidifying component can be solidified through the change in molecular structure thereof as it is heated. Specific examples of such protein are gluten, soybean protein, globulin, prolamine, glutelin, histone and protamine. Among them, the employment of gluten is more preferable as it is available quite easily. When these proteins are heated, three-dimentional crosslinking occurs and solidified, thereby enabling these proteins to act to keep, through the crosslinking structure thereof, the cells created by a foaming agent such as a surfactant.

The surfactant is provided with foamability but is not provided with foam-stabilizing property. The cells created by the surfactant can be retained by the incorporation of a solidifying component.

As for the surfactant, it is possible to employ a material having a hydrophobic moiety and a hydrophilic moiety in its molecule and further provided, at a terminal of the hydrophilic moiety, with a counter ion. There is not any particular limitation with regard to the combination between the hydrophobic moiety and the hydrophilic moiety. As for the hydrophobic group to be employed herein, the following groups can be exemplified.

Namely, the hydrophobic group of the surfactant may be linear alkyl (8 to 18 in the number of carbon atoms), branched alkyl (8 to 18 in the number of carbon atoms), poly-chain type group (e.g., hardened castor oil), alkyl benzene (8 or 9 in the number of carbon atoms), alkyl naphthalene (8 to 10 in the number of carbon atoms), polyoxypropylene, perfluoroalkyl (4 to 9 in the number of carbon atoms), polysiloxane, etc.

As for specific examples of the hydrophilic group of the surfactant, they include dissociated fatty acid exhibiting anionic property, sulfate, sulfonate, sulfosuccinate, phosphate, methyltaurine, isethionic acid, primary amine exhibiting cationic property, quaternary ammonium, pyridinium, imidazolium, carboxypendaine exhibiting amphoteric property, sulfobetain, hydroxysulfobetain, imidazolium betain, and β-aminopropionic acid.

As for specific examples of the counter ion of hydrophilic group, they include alkaline metals, alkaline earth metals, ammonium, halogen, acetic acid, methyl sulfate, and ethyl sulfate.

As for specific examples of the counter ion of hydrophilic group, they include sodium dodecyl sulfate, sodium oleate, monostearic acid, oleic acid, sodium dodecyl sulfonate, sodium dodecyl-N-sarcosinic acid, sodium cholic acid, sodium oxycholic acid, sodium taurodeoxycholic acid, cetyltrimethyl ammonium bromide, dodecylpyridium chloride, 3-[(chole amide propyl)dimethyl ammonio]-1-propane sulfonate, palmitoyl lysolecithin, dodecyl-β-alanine, octylgylcoside, octylthiogylcoside, decanoyl-N-methylglucamide, polyoxyethylene dodecyl ether, polyoxyethylene i-octylphenyl ether, polyoxyethylene nonylphenyl ether, polyoxyethylene fatty ester, and polyoxyethylene sorbitol ester.

The surfactant is capable of promoting the water-solubility of the resin composition constituting a foam. Namely, the surfactant acts to promote the formation of a molecular complex between a resin composition and water, and to enhance the compatibility of system through the enhancement of solubilization by micelle formation. In this manner, the surfactant is effective in enhancing the homogeneity of constituent components and also in improving the mechanical properties of foam.

In this embodiment of the present invention, the total of the surfactant and the solidifying component (protein) should preferably be confined within the range of 10 to 300 parts by weight based on 100 parts by weight of alginic acids. More preferably, the total of the surfactant and the solidifying component should be confined to not more than 100 parts by weight based on 100 parts by weight of alginic acids.

If the total of the surfactant and the solidifying component is less than 10 parts by weight based on 100 parts by weight of alginic acids, it would be impossible to stabilize the cells and the cells may be vanished prior to the step of forming a foam. On the other hand, if the total of the surfactant and the solidifying component exceeds 300 parts by weight based on 100 parts by weight of alginic acids, the foam to be obtained would become insufficient in compression strength and fragile, thus making it impossible to obtain a foam suited to practical use.

Further, the mixing ratio of the solidifying component should preferably be confined within the range of 10 to 100 parts by weight based on 100 parts by weight of the surfactant. If the mixing ratio of the solidifying component falls outside this range, the cells are more likely to vanish and a foam to be obtained would become low in porosity.

The foam according to this embodiment of the present invention can be manufactured in the same manner as described above except that a mixture comprising a surfactant and a solidifying component, both mixed at a predetermined mixing ratio, is employed. Namely, first of all, a solution comprising a surfactant and a solidifying component is foamed to form a foamed solution to which an aqueous solution of alginic acids is added. Subsequently, to this resultant mixture, alginic acid, in a solid state, is added and stirred. Finally, resultant mixture is heated to obtain a foam according to this embodiment of the present invention. If desired, the aforementioned various additives may be incorporated in the foam.

The foam according to the embodiments of the present invention can be utilized as a packaging material for industrial, agricultural and food products (such as food trays). It is also possible to utilize the foam as packaging containers (one-way containers), toys, sheets, furniture components, building materials, parts of car, electric household appliances, components for office automation equipments, materials for interior decoration, materials for housing, etc. Furthermore, the foam according to the embodiment of the present invention may be edible, so that it is also useful as a covering material for food.

Next, the present invention will be further explained with reference to specific examples which are not intended to restrict the present invention.

EXAMPLE 1

5 g of albumin as protein was dissolved in 15 mL of water to prepare an aqueous solution of protein, which was then foamed by using a domestic blender to obtain a foamed aqueous solution. To this foamed aqueous solution was added 40 g of a 5% aqueous solution of sodium alginate as an aqueous solution of alginate to obtain a mixture, which was then further stirred. After confirming the creation of bubble in the mixture, 3 g of sodium alginate powder was further added to the mixture and stirred to prepare a homogeneous foam precursor.

The foam precursor was then placed in an aluminum mold and dried by heating for 8 hours in a drying oven at a temperature of 130° C. to prepare a foam. The foam thus prepared was found to contain a large number of small and uniform cells. When a central portion of this foam was cut down, a gel-like substance was not recognized in the core portion of the foam, thus confirming that cells were uniformly distributed even in the core portion of the foam.

When the foam was dipped into an aqueous solution of alkali, the foam was found insoluble, thus confirming that the albumin employed as protein had been denatured.

EXAMPLE 2

A foam was prepared by repeating the same procedures as described in Example 1 except that 0.2 g of sucrose was further added to the aqueous solution of protein. When the foam thus obtained was observed in the same manner as in Example 1, a gel-like substance was not recognized in the core portion of the foam, thus confirming that cells were uniformly distributed even in the core portion of the foam.

When the foam was dipped into an aqueous solution of alkali, the foam was found insoluble, thus confirming that the albumin employed as protein had been denatured.

EXAMPLE 3

A foam was prepared by repeating the same procedures as described in Example 1 except that 1 g of glycerin was further added to the aqueous solution of protein. When the foam thus obtained was observed in the same manner as in Example 1, a gel-like substance was not recognized in the core portion of the foam, thus confirming that cells were uniformly distributed even in the core portion of the foam. The foam obtained in this example was found elastic. When the foam was dipped into an aqueous solution of alkali, the foam was found insoluble, thus confirming that the albumin employed as protein had been denatured.

EXAMPLE 4

A foam precursor was prepared by repeating the same procedures as described in Example 1 except that, as protein, 5 g of gelatin was substituted for the albumin and 0.1 g of sucrose was further added to the aqueous solution of protein. The foam precursor was then placed in an aluminum mold and dried by heating for 15 hours in a drying oven at a temperature of 120° C. to prepare a foam. When the foam thus obtained was observed in the same manner as in Example 1, a gel-like substance was not recognized in the core portion of the foam, thus confirming that cells were uniformly distributed even in the core portion of the foam. When the foam was dipped into an aqueous solution of alkali, the foam was found insoluble, thus confirming that the gelatin employed as protein had been denatured.

EXAMPLE 5

3 g of sodium dodecyl sulfate as a surfactant and 1 g of gluten as a solidifying component (protein) were dissolved in 10 mL of water to prepare an aqueous solution, which was then foamed by using a domestic blender to obtain a foamed aqueous solution. To this foamed aqueous solution was added 40 g of a 5% aqueous solution of sodium alginate as an aqueous solution of alginate to obtain a mixture, which was then further stirred. After confirming the creation of bubble in the mixture, 3 g of sodium alginate powder was further added to the mixture and stirred to prepare a homogeneous foam precursor.

The foam precursor was then placed in an aluminum mold and dried by heating for 10 hours in a drying oven at a temperature of 170° C. to prepare a foam. The foam thus prepared was found to contain a large number of small and uniform cells. When a central portion of this foam was cut down, a gel-like substance was not recognized in the core portion of the foam, thus confirming that cells were uniformly distributed even in the core portion of the foam. When the foam was dipped into an aqueous solution of alkali, the foam was found insoluble, thus confirming that the gluten employed as protein had been denatured.

EXAMPLE 6

A foam precursor was prepared by repeating the same procedures as described in Example 1 except that the quantity of albumin employed as protein was changed to 3 g. The foam precursor was then placed in an aluminum mold and dried by heating for 10 hours in a drying oven at a temperature of 150° C. to prepare a foam. When the foam thus obtained was observed in the same manner as in Example 1, a gel-like substance was not recognized in the core portion of the foam, thus confirming that cells were uniformly distributed even in the core portion of the foam. The content of nitrogen was found 5 atom. %. When the foam was dipped into an aqueous solution of alkali, the foam was found. insoluble, thus confirming that the albumin employed as protein had been denatured.

EXAMPLE 7

3 g of albumen as protein was dissolved in 15 mL of water to prepare an aqueous solution of protein, which was then foamed by using a domestic blender to obtain a foamed aqueous solution. To this foamed aqueous solution was added 40 g of a 5% aqueous solution of sodium alginate as an aqueous solution of alginate to obtain a mixture, which was then further stirred. After confirming the creation of bubble in the mixture, 3 g of sodium alginate powder was further added to the mixture and stirred to prepare a homogeneous foam precursor.

The foam precursor was then placed in an aluminum mold and dried by heating for 10 hours in a drying oven at a temperature of 170° C. to prepare a foam. When the foam thus obtained was observed in the same manner as described above, a gel-like substance was not recognized in the core portion of the foam, thus confirming that cells were uniformly distributed even in the core portion of the foam.

When the foam was dipped into an aqueous solution of alkali, the foam was found insoluble, thus confirming that the albumen employed as protein had been denatured.

EXAMPLE 8

A foam precursor was prepared by repeating the same procedures as described in Example 1 except that, as protein, 3 g of gelatin was substituted for the albumin. The foam precursor thus obtained was then placed in an aluminum mold and dried by heating for 10 hours in a drying oven at a temperature of 170° C. to prepare a foam. When the foam thus obtained was observed in the same manner as in Example 1, a gel-like substance was not recognized in the core portion of the foam, thus confirming that cells were uniformly distributed even in the core portion of the foam. When the foam was dipped into an aqueous solution of alkali, the foam was found insoluble, thus confirming that the gelatin employed as protein had been denatured.

EXAMPLE 9

A foam precursor was prepared by repeating the same procedures as described in Example 5. The foam precursor was then placed in an aluminum mold and dried by heating for 12 hours in a drying oven at a temperature of 150° C. to prepare a foam. The foam thus prepared was found to contain a large number of small and uniform cells. When a central portion of this foam was cut down, a gel-like substance was not recognized in the core portion of the foam, thus confirming that cells were uniformly distributed even in the core portion of the foam. When the foam was dipped into an aqueous solution of alkali, the foam was found insoluble, thus confirming that the gluten employed as protein had been denatured.

EXAMPLE 10

5 g of sodium dodecyl sulfate as a surfactant and 1 g of gluten as a solidifying component (protein) were dissolved in 10 mL of water to prepare an aqueous solution, which was then foamed by using a domestic blender to obtain a foamed aqueous solution. To this foamed aqueous solution was added 40 g of a 5% aqueous solution of propyleneglycol alginate as an aqueous solution of alginate to obtain a mixture, which was then further stirred. After confirming the creation of bubble in the mixture, 3 g of sodium alginate powder was further added to the mixture and stirred to prepare a homogeneous foam precursor.

The foam precursor was then placed in an aluminum mold and dried by heating for 16 hours in a drying oven at a temperature of 130° C. to prepare a foam. The foam thus prepared was found to contain a large number of small and uniform cells. When a central portion of this foam was cut down, a gel-like substance was not recognized in the core portion of the foam, thus confirming that cells were uniformly distributed even in the core portion of the foam. When the foam was dipped into an aqueous solution of alkali, the foam was found insoluble, thus confirming that the gluten employed as protein had been denatured.

COMPARATIVE EXAMPLE 1

24 g of sodium alginate was dissolved in 800 g of hot water to prepare an aqueous solution, to which 36 g of glycerin was added to obtain a mixture. Furthermore, 2.0 g of polyoxyethylene sorbitan monolaurate was added as a surfactant to the mixture. The resultant mixture was then foamed by using a blender to obtain a foam precursor. When the volume of the foam precursor was increased to 3 L, the foam precursor was placed in an aluminum mold.

The foam precursor was then dried by heating for 15 minutes in a drying oven at a temperature of 170° C. 15 minutes later, the aluminum mold was taken out of the drying oven and the dried product was cut down with a knife to observe the core portion thereof. As a result, the formation of only one cell was recognized and the core portion thereof was gel-like. Namely, the product obtained was not a foam in a strict sense.

COMPARATIVE EXAMPLE 2

24 g of sodium alginate dissolved in 800 g of hot water to prepare an aqueous solution, to which 36 g of glycerin was added to obtain a mixture. Furthermore, 2.0 g of polyoxyethylene sorbitan monolaurate was added as a surfactant to the mixture. The resultant mixture was then foamed by using a blender to obtain a foam precursor. When the volume of the foam precursor was increased to 3 L, the foam precursor was placed in an aluminum mold.

The foam precursor was then dried by exposing it to a gas flow of 30° C, for 36 hours. As a result, the foam precursor was separated into two layers. Namely, while the upper layer was formed into a foam provided with cells, the lower layer was solidified in a gel-like state due to the sedimentation of water-containing alginic acid. When this product was left to stand for several days, the portion containing cells shrank and the cells had vanished one week later.

As apparent from the results described above, the foam containing alginic acids and denatured protein was uniform in porosity throughout the entire body thereof including the core portion thereof. On the other hand, in the cases of Comparative Examples 1 and 2 where a surfactant was employed as a foaming agent but no solidifying agent was employed, the core portion of the foam was turned gel-like and was found useless as a foam for practical application. Otherwise, the cells vanished in the cases of Comparative Examples 1 and 2 and hence the products thereof were incapable of functioning as a foam.

Further, in the case where a step of adding solid alginic acid was omitted after the preceding step of incorporating an aqueous solution of alginic acids into a foaming agent in the process of manufacturing a foam, the products obtained therefrom were not suited to practical use as a foam.

As explained above, according to the embodiment of the present invention, it is possible to provide a foam with uniform porosity and a method for manufacturing such a foam.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A foam comprising:
    a matrix material comprising denatured protein, a surfactant, and at least one compound selected from the group consisting of alginic acid, salts thereof, alginic propylene glycol esters, alginic acid wherein a hydroxyl group is replaced by an acetyl group, and alginic acid wherein a carboxylic group is replaced by an amide group or a propyl group, wherein the denatured protein is at least one denatured substance selected from the group consisting of gluten, soybean protein, globulin, prolamine, glutelin, histone, and protamine; and
    cells included in the matrix.

2. The foam according to claim 1, wherein a mixing ratio based on weight between the denatured protein and said at least one compound is confined within the range of 1:3 to 1:0.5.

3. A method of manufacturing a foam comprising:
    preparing an aqueous solution of protein having foamability and foam-stability;
    foaming the aqueous solution of protein having foamability and foam-stability to obtain a foamed aqueous solution;
    adding an aqueous solution of at lease one compound selected from the group consisting of alginic acid, salts thereof, alginic propylene glycol esters, alginic acid wherein a hydroxyl group is replaced by an acetyl group, and alginic acid wherein a carboxylic group is replaced by an amide group or a propyl group to the foamed aqueous solution, thereby obtaining a mixture;
    stirring the mixture to obtain a homogenous solution;
    adding, in a solid state, at least one compound selected from the group consisting of alginic acid, salts thereof, alginic propylene glycol esters, alginic acid wherein a hydroxyl group is replaced by an acetyl group, and alginic acid wherein a carboxylic group is replaced by an amide group or a propyl group to the mixed solution, thereby obtaining a foam precursor; and
    drying by heating the foam precursor to denature the protein having foamability and foam-stability, thereby obtaining a foam comprising a matrix and cells dispersed in the matrix, the matrix comprising said at least one compound and the denatured protein.

4. The method according to claim 3, wherein the protein having foamability and foam-stability is mixed with at least one compound at a ratio ranging from 5 to 300 parts by weight based on 100 parts by weight of alginic acid.

5. The method according to claim 3, wherein the protein having foamability and foam-stability is at least one material selected from the group consisting of gelatin, albumen, egg yolk, egg, saponin and albumin.

6. The method according to claim 3, further comprising adding sucrose before foaming the aqueous solution of protein having foamability and foam- stability.

7. The method according to claim 3, wherein the at least one compound is contained at a concentration within the range of 3 to 10% by weight in the aqueous solution.

8. The method according to claim 3, further comprising adding polyhydric alcohol into the mixture.

9. The method according to claim 3, wherein drying by heating is performed at a temperature ranging from 100° C. to 180° C.

10. The method according to claim 3, wherein drying by heating is performed for a period ranging from 10 minutes to 24 hours.

11. A method of manufacturing a foam comprising:
preparing an aqueous solution containing a foaming agent and protein having foam-stability;
foaming the aqueous solution to obtain a foamed aqueous solution;
adding an aqueous solution of at least one compound selected from the group consisting of alginic acid, salts thereof, alginic propylene glycol esters, alginic acid wherein a hydroxyl group is replaced by an acetyl group, and alginic acid wherein a carboxylic group is replaced by an amide group or a propyl group to the foamed aqueous solution, thereby obtaining a mixture;
stirring the mixture to obtain a homogenous solution;
adding, in a solid state, at least one compound selected from the group consisting of alginic acid, salts thereof, alginic propylene glycol esters, alginic acid wherein a hydroxyl group is replaced by an acetyl group, and alginic acid wherein a carboxylic group is replaced by an amide group or a propyl group to the mixed solution, thereby obtaining a foam precursor; and
drying by heating the foam precursor to denature the protein having foam-stability, thereby obtaining a foam comprising a matrix and cells dispersed in the matrix, the matrix comprising said at least one compound and denatured protein.

12. The method according to claim 11, wherein the protein having foam-stability is mixed with the foaming agent at a ratio ranging from 10 to 100 parts by weight based on 100 parts by weight of the foaming agent.

13. The method according to claim 11, wherein a total of the foaming agent and the protein having foam-stability is confined with the range of 50 parts by weight to 300 parts by weight based on 100 parts by weight of the at least one compound.

14. The method according to claim 11, wherein the foaming agent is a surfactant selected from the group consisting of sodium dodecyl sulfate, sodium oleate, monostearic acid, oleic acid, sodium dodecyl sulfonate, sodium dodecyl-N-sarcosinic acid, sodium cholic acid, sodium oxycholic acid, sodium taurodeoxycholic acid, cetyltrimethyl ammonium bromide, dodecylpyridium chloride, 3-[(chole amide propyl) dimethyl ammonio]-1-propane sulfate, palmatoyl lysolecithin, dodecyl-β-alanine, octylglycoside, octylthioglycoside, decanoyl-N-methylglucamide, polyoxyethylene dodecyl ether, polyoxyethylene i-octylphenyl ether, polyoxyethylene nonylphenyl ether, polyoxyethylene fatty ester, and polyoxyethylene sorbitol ester.

15. The method according to claim 11, wherein the protein having foam-stability is at least one selected from the group consisting of gluten, soybean protein, globulin, prolamine, glutelin, histone and protamine, the matrix further comprising a surfactant.

16. The method according to claim 11, wherein the at least one compound is contained at a concentration within the range of 3 to 10% by weight in the aqueous solution.

17. The method according to claim 11, wherein drying by heating is performed at a temperature ranging from 100° C. to 180° C.

18. The method according to claim 11, wherein drying by heating is performed for a period ranging from 10 minutes to 24 hours.

19. A foam comprising:
a matrix formed of denatured protein and at least one compound selected from the group consisting of alginic acid, salts thereof, alginic propylene glycol esters, alginic acid wherein a hydroxyl group is replaced by an acetyl group, and alginic acid wherein a carboxylic group is replaced by an amide group or a propyl group, wherein the concentration of the at least one compound is within a range of from 3 to 10% by weight; and
cells included in the matrix.

* * * * *